US012669862B2

(12) United States Patent
Zhong et al.

(10) Patent No.: US 12,669,862 B2
(45) Date of Patent: *Jun. 30, 2026

(54) VIDEO TAGGING FOR VIDEO COMMUNICATIONS

(71) Applicant: Agora Lab, Inc., Santa Clara, CA (US)

(72) Inventors: Sheng Zhong, Santa Clara, CA (US); Yue Feng, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/961,868

(22) Filed: Nov. 27, 2024

(65) Prior Publication Data

US 2025/0093945 A1     Mar. 20, 2025

Related U.S. Application Data

(63) Continuation of application No. 17/212,552, filed on Mar. 25, 2021, now Pat. No. 12,204,686, which is a (Continued)

(51) Int. Cl.
| | |
|---|---|
| *H04N 21/442* | (2011.01) |
| *G06F 3/01* | (2006.01) |
| *G06F 3/041* | (2006.01) |
| *G06N 3/08* | (2023.01) |
| *G06V 10/764* | (2022.01) |
| *G06V 10/778* | (2022.01) |
| *G06V 20/40* | (2022.01) |
| *G06V 40/16* | (2022.01) |

(Continued)

(52) U.S. Cl.
CPC .............. *G06F 3/011* (2013.01); *G06F 3/013* (2013.01); *G06F 3/017* (2013.01); *G06F 3/041* (2013.01); *G06N 3/08* (2013.01); *G06V 10/764* (2022.01); *G06V 10/778* (2022.01);

*G06V 20/40* (2022.01); *G06V 40/174* (2022.01); *G06V 40/20* (2022.01); *G10L 15/1815* (2013.01); *G10L 15/22* (2013.01); *G10L 25/57* (2013.01); *G10L 25/63* (2013.01); *H04N 21/234* (2013.01); *H04N 21/44* (2013.01); *H04N 21/44218* (2013.01); *H04N 21/84* (2013.01)

(58) Field of Classification Search
None
See application file for complete search history.

(56) References Cited

U.S. PATENT DOCUMENTS

| | | | |
|---|---|---|---|
| 9,788,777 | B1 | 10/2017 | Knight et al. |
| 11,375,256 | B1 | 6/2022 | Dorner |

(Continued)

*Primary Examiner* — Omar S Parra
(74) *Attorney, Agent, or Firm* — Young Basile Hanlon & MacFarlane, P.C.

(57) ABSTRACT

Techniques for video communications include: transmitting, from a first apparatus, a first video stream of a first user to a second apparatus of a second user; receiving, from the second apparatus, a second video stream of the second user; determining a reaction of the second user to an area of interest in the first video stream using the second video stream; and updating a parameter for encoding the area of interest in the first video stream based on the reaction of the second user to the area of interest in the first video stream, and one or more tags associated with the reaction of the second user are used to train an adaptive encoder to automatically adjust the parameter for encoding the area of interest in the first video stream to optimize video viewing experiences based on the reaction of the second user.

20 Claims, 7 Drawing Sheets

Related U.S. Application Data continuation-in-part of application No. 16/013,280, filed on Jun. 20, 2018, now Pat. No. 10,990,812.

(51) Int. Cl.
| | |
|---|---|
| *G06V 40/20* | (2022.01) |
| *G10L 15/18* | (2013.01) |
| *G10L 15/22* | (2006.01) |
| *G10L 25/57* | (2013.01) |
| *G10L 25/63* | (2013.01) |
| *H04N 21/234* | (2011.01) |
| *H04N 21/44* | (2011.01) |
| *H04N 21/84* | (2011.01) |

(56)          References Cited

U.S. PATENT DOCUMENTS

| | | |
|---|---|---|
| 2007/0019866 A1 | 1/2007 | Ayres et al. |
| 2014/0003450 A1 | 1/2014 | Bentley et al. |
| 2014/0282111 A1 | 9/2014 | Gurbag et al. |
| 2014/0310595 A1 | 10/2014 | Acharya et al. |
| 2016/0085373 A1 | 3/2016 | Chang et al. |
| 2016/0196105 A1 | 7/2016 | Vartakavi et al. |
| 2018/0082313 A1 | 3/2018 | Duggin et al. |
| 2018/0293608 A1 | 10/2018 | Li |
| 2018/0338167 A1 | 11/2018 | Chi et al. |
| 2019/0089701 A1 | 3/2019 | Mercury et al. |
| 2019/0189117 A1 | 6/2019 | Kumar |
| 2019/0329134 A1 | 10/2019 | Shriram et al. |
| 2019/0348037 A1 | 11/2019 | Khullar et al. |
| 2020/0281480 A1 | 9/2020 | Tran |
| 2020/0366920 A1 | 11/2020 | Dedeoglu et al. |
| 2020/0405213 A1 | 12/2020 | Chappell, III et al. |
| 2021/0041953 A1 | 2/2021 | Poltorak |

VIDEO TAGGING FOR VIDEO COMMUNICATIONS

CROSS-REFERENCE TO RELATED APPLICATION(S)

This application is a continuation of U.S. patent application Ser. No. 17/212,552 filed Mar. 25, 2021, which is a continuation-in-part of U.S. patent application Ser. No. 16/013,280 filed Jun. 20, 2018 and issued as U.S. Pat. No. 10,990,812 on Apr. 27, 2021, the entire disclosures of both of which are hereby incorporated by reference.

TECHNICAL FIELD

This disclosure relates to video communications, and in particular, to video tagging in video communications systems.

BACKGROUND

Video quality is one of the focuses in real-time multimedia communications systems. In such systems, video data can be transmitted through a network (e.g., the Internet) between senders and receivers, such as mobile phones and personal computers. To evaluate and control video quality, some objective measure-based methods can be used. Such objective measures can include a peak signal-to-noise ratio (PSNR) and a structured similarity (SSIM).

Encoded and compressed video data can be packaged as a set of packets for network transmission. Due to network jitters, packets from a sender can be lost during transmission and may not arrive at a receiver. In some cases, a received packet can include corrupted bits that cannot be recovered at the receiver. Due to packet loss or corruption, the receiver may not be able to decode the related video in full quality. Another impacting factor for video quality is unstable network bandwidth (or "network traffic crowdedness"). Modern video encoders can adapt their encoding schemes and parameters (e.g., a video encoding bitrate, a frame rate, and/or a picture resolution) to the varying network conditions, which can result in video quality fluctuations. All of those effects can affect user experiences in real-time multimedia communications systems.

SUMMARY

Disclosed herein are implementations of methods, apparatuses, and systems for tagging a video for video communications.

In one aspect, a method for video communications is disclosed. The method includes transmitting, from a first apparatus using a network, a first video stream of a first user to a second apparatus of a second user, wherein the first user is in video communication with the second user; receiving, from the second apparatus using the network, a second video stream of the second user; determining, by a processor, a reaction of the second user to an area of interest in the first video stream using the second video stream; and updating a parameter for encoding the area of interest in the first video stream at the first apparatus based on the reaction of the second user to the area of interest in the first video stream, wherein one or more tags associated with the reaction of the second user to the area of interest in the first video stream are used to train an adaptive encoder to automatically adjust the parameter for encoding the area of interest in the first video stream to optimize video viewing experiences based on the reaction of the second user.

In another aspect, an apparatus for video communications is disclosed. The apparatus includes a processor and a memory coupled to the processor. The memory is configured to store instructions which when executed by the processor become operational with the processor to transmit a first video stream of a first user to a second apparatus of a second user, wherein the first user is in video communication with the second user; receive, from the second apparatus, a second video stream of the second user; determine a reaction of the second user to an area of interest in the first video stream using the second video stream; and update a parameter for encoding the area of interest in the first video stream based on the reaction of the second user to the area of interest in the first video stream, wherein one or more tags associated with the reaction of the second user to the area of interest in the first video stream are used to train an adaptive encoder to automatically adjust the parameter for encoding the area of interest in the first video stream to optimize video viewing experiences based on the reaction of the second user.

In another aspect, a non-transitory computer-readable medium storing a set of instructions which when executed by a processor of a computer system become operational with the processor for video communications to: transmit, from a first apparatus using a network, a first video stream of a first user to a second apparatus of a second user, wherein the first user is in video communication with the second user; receive, from the second apparatus using the network, a second video stream of the second user; determine a reaction of the second user to an area of interest in the first video stream using the second video stream; and update a parameter for encoding the area of interest in the first video stream at the first apparatus based on the reaction of the second user to the area of interest in the first video stream, wherein one or more tags associated with the reaction of the second user to the area of interest in the first video stream are used to train an adaptive encoder to automatically adjust the parameter for encoding the area of interest in the first video stream to optimize video viewing experiences based on the reaction of the second user.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
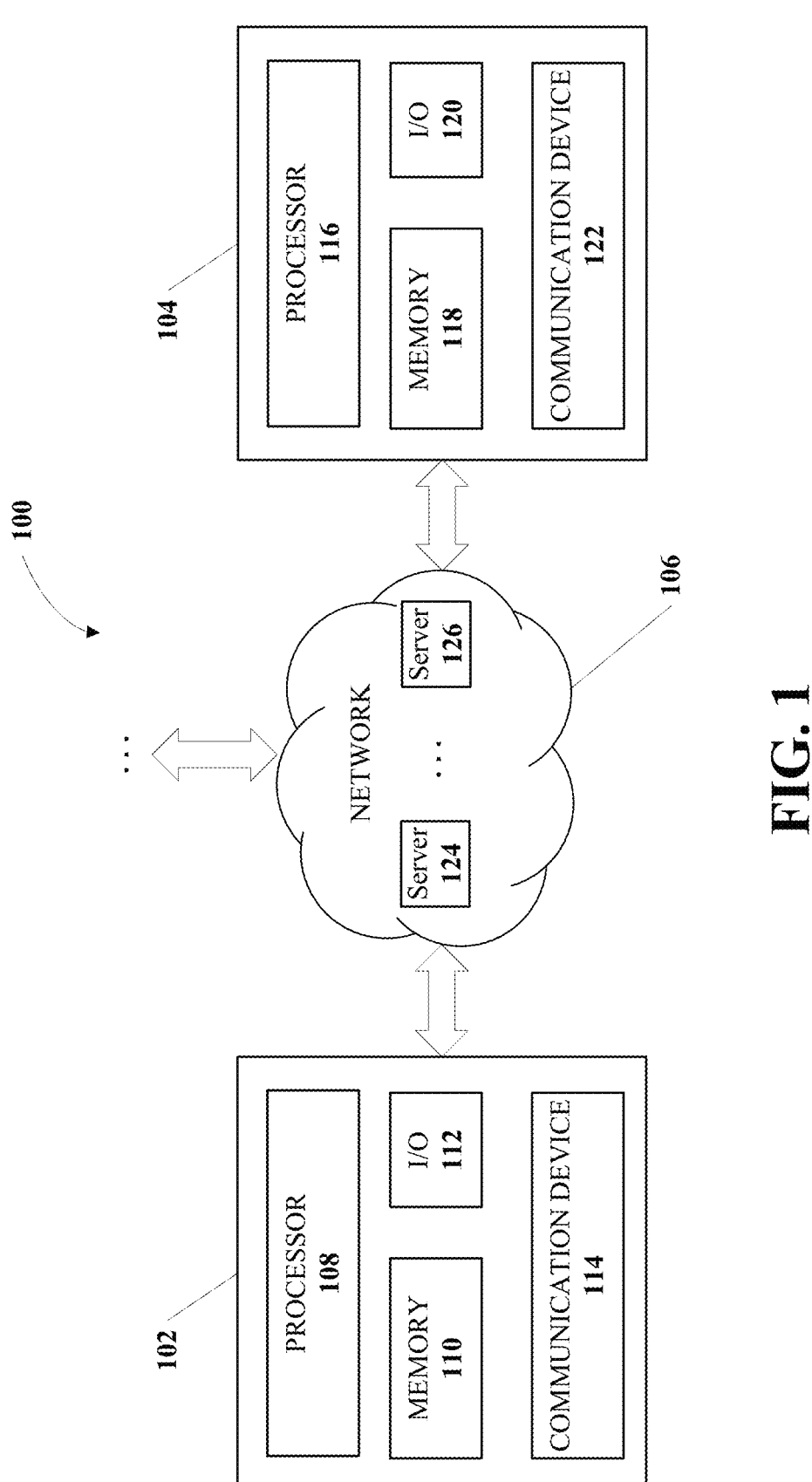
FIG. 1 is a diagram of an example system for media transmission according to implementations of this disclosure.

Online multimedia communications, such as video conference calls, live-stream video broadcasting, or Internet phone services, require accurate and efficient media data transmission. The media data can include audio data, video data, or any multimedia data including an audio sequence or a video sequence. Typically, media data can be stored in its original form or converted to form a video stream. The video stream can include time sequence data (e.g., an audio sequence including multiple audio samples, or a video sequence including multiple pictures or frames), feature-extracted residuals of the video stream (e.g., a residual picture after inter-prediction for a current picture in a video sequence), or equivalent quantities of the video stream in a transformed domain (e.g., transformed and/or quantized coefficients). The video stream can be encoded (or "compressed") into a compressed video stream (e.g., a video bitstream) for transmission over a network. The compressed video stream can be transmitted over a network (e.g., the Internet) in data packets (or "packets" for simplicity).

When encoding a video stream (also referred to as a "video sequence"), each picture of the video stream can be encoded using information within the same picture for prediction (referred to as "intra-picture prediction" or "intra-prediction"), or information between different pictures for prediction (referred to as "inter-picture prediction" or "inter-prediction"). In inter-prediction, motion estimation (ME) and motion compensation (MC) can be performed between at least two different pictures. A picture coded using intra-prediction can be referred to as an "I-picture," and a picture coded using inter-prediction can be referred to as a "P-picture." When decoding, the I-picture can be decoded without referencing another picture. The P-picture can be decoded using another picture as a reference (referred to as a "reference picture"). The reference picture can be an I-picture or another P-picture. The encoder can decide the mode of prediction for a picture being encoded (referred to as a "current picture"). When a picture is being decoded (also referred to as a "current picture"), the decoder can determine which mode of prediction to use based on information received and extracted from a header of the current picture. Details of the video encoding and decoding processes will be described in FIGS. 3-4.

In real-time video communications systems, monitoring and measuring user viewing experience is valuable for many aspects. An accurate measure of user experience can be utilized to adjust video coding and transmission strategy to improve user experience. The measurement can include objective measures, such as a delay time, a packet loss ratio, a resolution change, a frame rate change, or a bitrate change. However, subjective user viewing experience cannot be reflected in general by those objective measures. In addition, an adjusted video coding and transmission strategy based solely on such objective measures can aggravate problems in some cases. For example, to mitigate a network jam, one solution is to resend lost packets of a key picture (e.g., an I-picture). However, resending the lost packets can cause additional network traffic, which can further aggravate the network jam.

Due to interactional social contexts carried by the video communications, the use of subjective measures of video quality are important for evaluating video quality and adjusting the video coding and transmission strategies. To improve user experience, methods using user awareness of the video quality and user viewing experience between communicating users can be utilized to evaluate video quality and improve video coding and transmission strategies. Some of those methods rely on a large amount of video data tagged with labels or annotations that represent user feedback. For example, such tags (also referred to as "labels" or "annotations") can include "happiness," "surprise," "sadness," "disgust," "anger," and so on. For another example, such tags can include user facial expressions. The tags can represent positive, negative, or neutral reactions to the video quality. Based on such tagged video data, video encoders can be trained (e.g., using a machine learning technique) to automatically adapt the coding parameters to the subjective and objective measures of video quality.

However, to prepare such tagged video data in large amounts can be challenging and costly. In some implementations, the tags can be collected by prompting users to select a rating (e.g., in a five-star scale) for an ended video communication. Nevertheless, such a rating is an overall evaluation of the whole of the video communication and cannot reflect users' real-time evaluations of different portions of the video. The overall evaluation can contribute limited data for evaluating video quality fluctuations. In addition, prompting the user to provide a rating is an extra interaction after the video communication has ended, one in which not all users are actively interested in participating. Thus, the aggregation of user ratings cannot be an accurate reflection of the video quality.

In some implementations, the tags can be obtained by using a machine learning technique. For example, a human individual can act in designed reactions, gestures, expressions, and emotions in front of a camera. Video data can be recorded for such multiple individuals. Such video data can be referred to as "acted video data." Acted video data can be used as truth labels for a supervised learning technique (e.g., a convolutional neural network (CNN) technique). The trained model can be used in real-time video communications for reaction determinations. Nevertheless, acted video data can be inaccurate because designed simulations may not reflect real reactions or the social contexts in which such reactions occur. It is better to use tags obtained in videos reflecting actual scenarios, which can be referred to as "naturalistic video data."

According to implementations of this disclosure, the disclosed methods, apparatuses, and systems can collect naturalistic video data in real-time video communications systems for user experience improvement. The disclosed methods can be used to decode video streams between communicating users to analyze and identify user reactions in response to the quality of the video streams. In a network-based real-time video communications system, a first video stream of a first user can be encoded and transmitted to a second user, and a second video stream of a second user can be encoded and transmitted back to the first user. The first and second users can have visual and acoustic interactions with each other. When network jitter occurs, the video quality of one or both of the first and second video streams may fluctuate. The first and second users can have natural reactions to such video quality fluctuations. When the video quality deteriorates or improves, such reactions can include a facial expression (e.g., a frown or a smile), a gesture (e.g., a nod or a shoulder shrug), a characteristic of speech (e.g., a manner of speech, a raised tone or a relieved tone), or a semantic meaning of the speech (e.g., a verbal complaint or a verbal praise). By performing analysis on those reactions, the reactions can also include inferred user emotions, such as happiness, calmness, concern, surprise, frustration, sadness, disgust, or anger. For example, when the first user receives the second video stream, the reactions of the second user in response to the video quality of the first video stream can be included in the pictures and audio of the second video stream.

Those reactions can be analyzed and determined from decoded video streams. For example, by analyzing the decoded pictures and audio of the second video stream, the reactions of the second user can be extracted and inferred. The determined reactions of the second user can be tagged to the first video stream to form the naturalistic video data. For accuracy, before tagging, the reactions of the second user can be temporally synchronized to the portion of the first video stream that the second user has reacted to. The tagged video data can be utilized for adjusting video coding and transmission schemes of the real-time video communications between the first and second users. The tagged video data can also be stored for later use in training video encoders.

FIG. 1 is a diagram of an example system 100 for media transmission according to implementations of this disclosure. As shown in FIG. 1, the system 100 can include multiple apparatuses and networks, such as an apparatus 102, an apparatus 104, and a network 106. The apparatuses can be implemented by any configuration of one or more computers, such as a microcomputer, a mainframe computer, a supercomputer, a general-purpose computer, a special-purpose/dedicated computer, an integrated computer, a database computer, a remote server computer, a personal computer, a laptop computer, a tablet computer, a cell phone, a personal data assistant (PDA), a wearable computing device, or a computing service provided by a computing service provider, for example, a web host or a cloud service provider. In some implementations, the computing device can be implemented in the form of multiple groups of computers that are at different geographic locations and can communicate with one another, such as by way of a network. While certain operations can be shared by multiple computers, in some implementations, different computers are assigned to different operations. In some implementations, the system 100 can be implemented using general-purpose computers/processors with a computer program that, when executed, carries out any of the respective methods, algorithms, and/or instructions described herein. In addition, or alternatively, for example, special-purpose computers/processors including specialized hardware can be utilized for carrying out any of the methods, algorithms, or instructions described herein.

The apparatus 102 can have an internal configuration of hardware including a processor 108 and a memory 110. The processor 108 can be any type of device or devices capable of manipulating or processing information. In some implementations, the processor 108 can include a central processor (e.g., a central processing unit or CPU). In some implementations, the processor 108 can include a graphics processor (e.g., a graphics processing unit or GPU). Although the examples herein can be practiced with a single processor as shown, advantages in speed and efficiency can be achieved by using more than one processor. For example, the processor 108 can be distributed across multiple machines or devices (each machine or device having one or more processors) that can be coupled directly or connected via a network (e.g., a local area network). The memory 110 can include any transitory or non-transitory device or devices capable of storing codes and data that can be accessed by the processor (e.g., via a bus). The memory 110 herein can be a random-access memory (RAM) device, a read-only memory (ROM) device, an optical/magnetic disc, a hard drive, a solid-state drive, a flash drive, a security digital (SD) card, a memory stick, a compact flash (CF) card, or any combination of any suitable type of storage device. In some implementations, the memory 110 can be distributed across multiple machines or devices, such as in the case of a network-based memory or cloud-based memory. The memory 110 can include data (not shown), an operating system (not shown), and an application (not shown). The data can include any data for processing (e.g., an audio stream, a video stream, or a multimedia stream). The application can include programs that permit the processor 108 to implement instructions to generate control signals for performing functions of the methods in the following description.

In some implementations, in addition to the processor 108 and the memory 110, the apparatus 102 can also include a secondary (e.g., external) storage device (not shown). When present, the secondary storage device can provide additional memory when high processing needs exist. The secondary storage device can be a storage device in the form of any suitable non-transitory computer-readable medium, such as a memory card, a hard disk drive, a solid-state drive, a flash drive, or an optical drive. Further, the secondary storage device can be a component of the apparatus 102 or can be a shared device accessible via a network. In some implementations, the application in the memory 110 can be stored in whole or in part in the secondary storage device and loaded into the memory 110 as needed for processing.

In addition to the processor 108 and the memory 110, the apparatus 102 can include input/output (I/O) devices. For example, the apparatus 102 can include an I/O device 112. The I/O device 112 can be implemented in various ways, for example, it can be a display that can be coupled to the apparatus 102 and configured to display a rendering of graphics data. The I/O device 112 can be any device capable of transmitting a visual, acoustic, or tactile signal to a user, such as a display, a touch-sensitive device (e.g., a touchscreen), a speaker, an earphone, a light-emitting diode (LED) indicator, or a vibration motor. The I/O device 112 can also be any type of input device either requiring or not requiring user intervention, such as a keyboard, a numerical keypad, a mouse, a trackball, a microphone, a touch-sensitive device (e.g., a touchscreen), a sensor, or a gesture-sensitive input device. If the I/O device 112 is a display, for example, it can be a liquid crystal display (LCD), a cathode-ray tube (CRT), or any other output device capable of providing a visual output to an individual. In some cases, an output device can also function as an input device—a touchscreen display configured to receive touch-based input, for example.

The I/O device 112 can alternatively or additionally be formed of a communication device for transmitting signals and/or data. For example, the I/O device 112 can include a wired means for transmitting signals or data from the apparatus 102 to another device. For another example, the I/O device 112 can include a wireless transmitter or receiver using a protocol compatible to transmit signals from the apparatus 102 to another device or to receive signals from another device to the apparatus 102.

In addition to the processor 108 and the memory 110, the apparatus 102 can optionally include a communication device 114 to communicate with another device. Optionally, the communication can be via a network 106. The network 106 can be one or more communications networks of any suitable type in any combination, including, but not limited to, networks using Bluetooth communications, infrared communications, near-field communications (NFCs), wireless networks, wired networks, local area networks (LANs), wide area networks (WANs), virtual private networks (VPNs), cellular data networks, or the Internet. The communication device 114 can be implemented in various ways, such as a transponder/transceiver device, a modem, a router, a gateway, a circuit, a chip, a wired network adapter, a wireless network adapter, a Bluetooth adapter, an infrared adapter, an NFC adapter, a cellular network chip, or any suitable type of device in any combination that is coupled to the apparatus 102 to provide functions of communication with the network 106.

Similar to the apparatus 102, the apparatus 104 includes a processor 116, a memory 118, an I/O device 120, and a communication device 122. The implementations of elements 116-122 of the apparatus 104 can be similar to the corresponding elements 108-114 of the apparatus 102. For example, the apparatus 102 can be used as a decoding apparatus (referred to as a "decoder"), and the apparatus 104 can be used as an encoding device (referred to as an "encoder"), or vice versa. The apparatus 102 can communicate with the apparatus 104 via the network 106. The apparatuses 102 and 104 can also communicate with other apparatuses (not shown) connected to the network 106.

The network 106 can include multiple server computers (or "servers" for simplicity). The servers can interconnect with each other. The servers can also connect to end-user apparatuses, such as the apparatus 102 and the apparatus 104. A server directly connected to an end-user apparatus or a private network to the Internet can be referred to as an "edge server." In FIG. 1, a server 124 is an edge server directly connected to the apparatus 102 to the network 106 (e.g., the Internet), and a server 126 is an edge server directly connected to the apparatus 104 to the network 106. The network 106 can include multiple edge servers and non-edge servers. It should be noted that edge servers can be directly or indirectly connected to each other in the network 106. For example, the servers 124 and 126 can be indirectly connected to each other (i.e., at least a third server is connected between the servers 124 and 126 in the network 106). It should also be noted that end-user apparatuses or private networks can share the same edge server. For example, the server 124 can be the edge server directly connected to the apparatus 102 and the apparatus 104.

The apparatuses 102 and 104 (and any algorithms, methods, instructions, etc., stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors, or any other suitable circuit. In this disclosure, the term "processor" should be understood as encompassing any the foregoing, either singly or in combination. The terms "signal," "data," and "information" are used interchangeably. Further, portions of the apparatuses 102 and 104 do not necessarily have to be implemented in the same manner.

It should be noted that parts or components of the coding devices (e.g., the apparatuses 102 and 104) and systems for video tagging can include elements not limited to those shown in FIG. 1. Without departing from the scope of this disclosure, the coding devices and systems for video tagging can include more or fewer parts, components, and hardware or software modules for performing various functions in addition or related to encoding and decoding.

Figure 2:
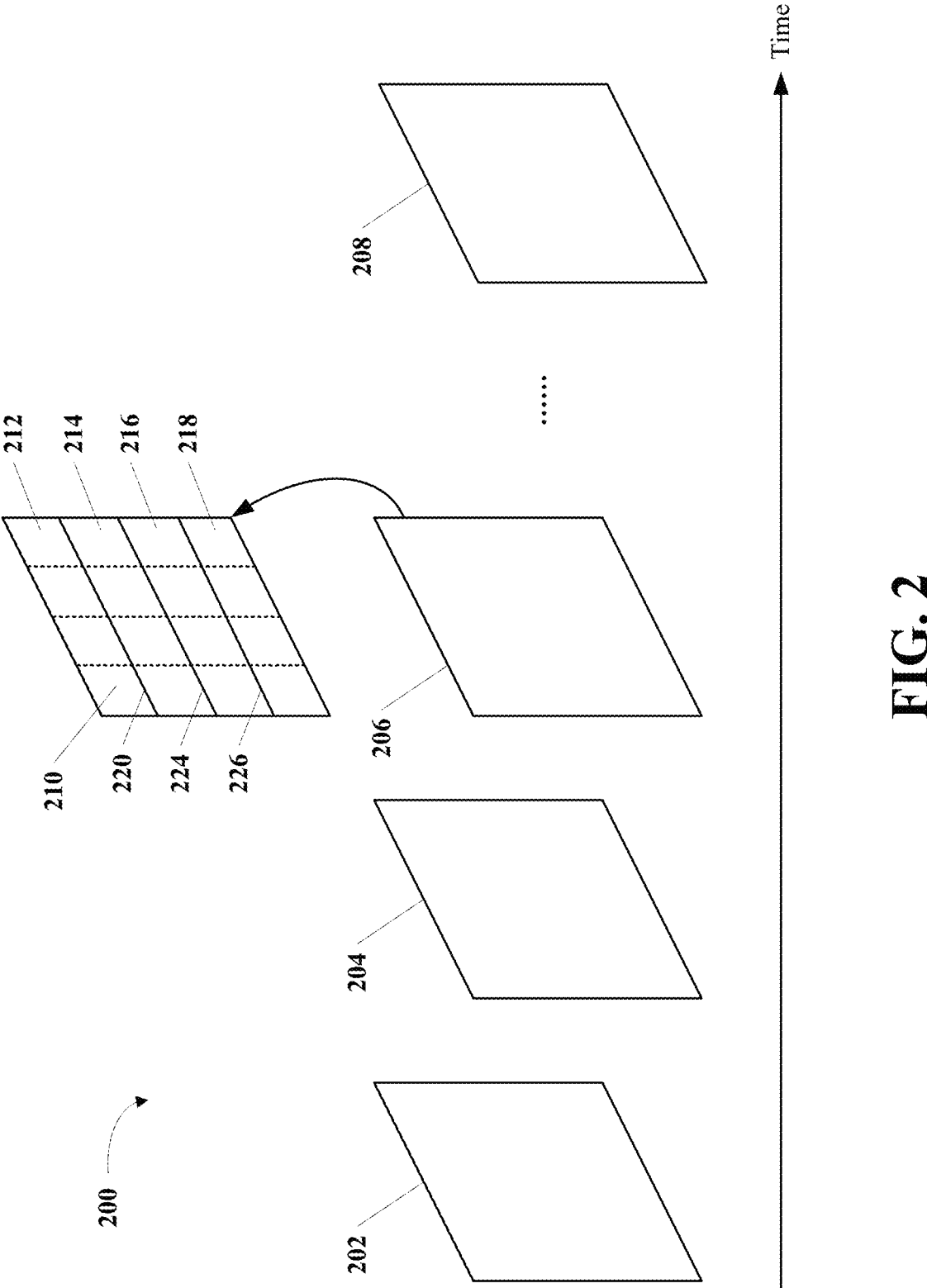
FIG. 2 is a diagram of example pictures of a video stream.

FIG. 2 shows example pictures of a video stream 200. The video stream 200 can be a video source stream for encoding or a video stream decoded from a video bitstream. A timeline is shown in FIG. 2, the arrow of which indicates the direction of time. The video stream 200 can include a series of pictures along the timeline, including pictures 202-208. For example, the picture 208 can be the current picture. If the picture 208 is being encoded or decoded using inter-prediction (i.e., the picture 208 is a P-picture), its reference picture is temporally prior to the same. That is, the reference picture for the picture 208 as a P-picture can be the picture 206, 204, 202, or any picture earlier in the timeline than the picture 208.

Each picture of the video stream 200 can be divided into multiple processing units. ME and MC can be performed on the level of the processing units. In some video coding standards, the processing units can be referred to as "macroblocks" or "coding tree blocks" (CTBs). In some implementations, each processing unit can be further divided into one or more processing sub-units for ME and MC, in which the processing sub-units are referred to as "prediction blocks" or "coding units" (CUs) depending on the standards. The size and shape of the processing units and sub-units can be arbitrary, such as 8×8, 8×16, 16×16, 32×32, 64×64, or any size in any shape suitable for encoding a region of the picture. Typically, the more details the region includes, the smaller size the processing units and sub-units can be. For ease of explanation without causing ambiguity, the processing units and sub-units are uniformly referred to as "blocks" hereinafter unless explicitly described otherwise. For example, in FIG. 2, the picture 206 can be shown to have 4×4 blocks, including a block 210. The boundaries of the blocks are shown in dotted lines.

In some implementations, the blocks can be grouped, forming a special region or partition of the picture. In other words, the picture can be divided into one or more regions or partitions, and each region or partition can include one or more blocks. Such regions or partitions can be referred to as "slices," "tiles," or any other name depending on the video coding standards. For ease of explanation without causing ambiguity, such regions or partitions are referred to as "slices" hereinafter unless explicitly described otherwise herein. For example, the picture 206 can be divided into four slices 212-218, each slice having four blocks. The slices 212-218 can have boundaries 220-226 in between, shown as solid lines.

Slices can be used for parallel processing. ME and MC can be performed for blocks belonging to one slice (i.e., ME and MC will not be performed using blocks outside the slice), and the encoding can be performed simultaneously and independently for the slices. For example, the slices 212-218 can be parallelly processed, which can increase the efficiency of video encoding. Similarly, the slices can also be parallelly decoded at a decoder. Slices of an I-picture can be I-slices, and slices of a P-picture can be P-slices.

It should be noted that the slice herein can include any number of any blocks in any configuration, and is not limited to the aforementioned examples (e.g., the slices 212-218). For example, the slice can be in a non-rectangular shape, such as including blocks of different rows (not shown). For another example, the slice can include blocks grouped in a non-contiguous manner, such as two or more non-contiguous block groups. For another example, a part of a first slice can be within a part of a second slice. For another example, the first slice can be enclosed by the second slice (e.g., the first slice can be within the second slice).

It should also be noted that the division or segmentation of the slices can be changed or unchanged in the video stream. In other words, the boundaries between the slices can be changed or unchanged. In some implementations, the pictures of the video stream can be divided into slices in the same pattern. In some implementations, the pattern of the slice division can change between different sets of pictures of the video stream.

Figure 3:
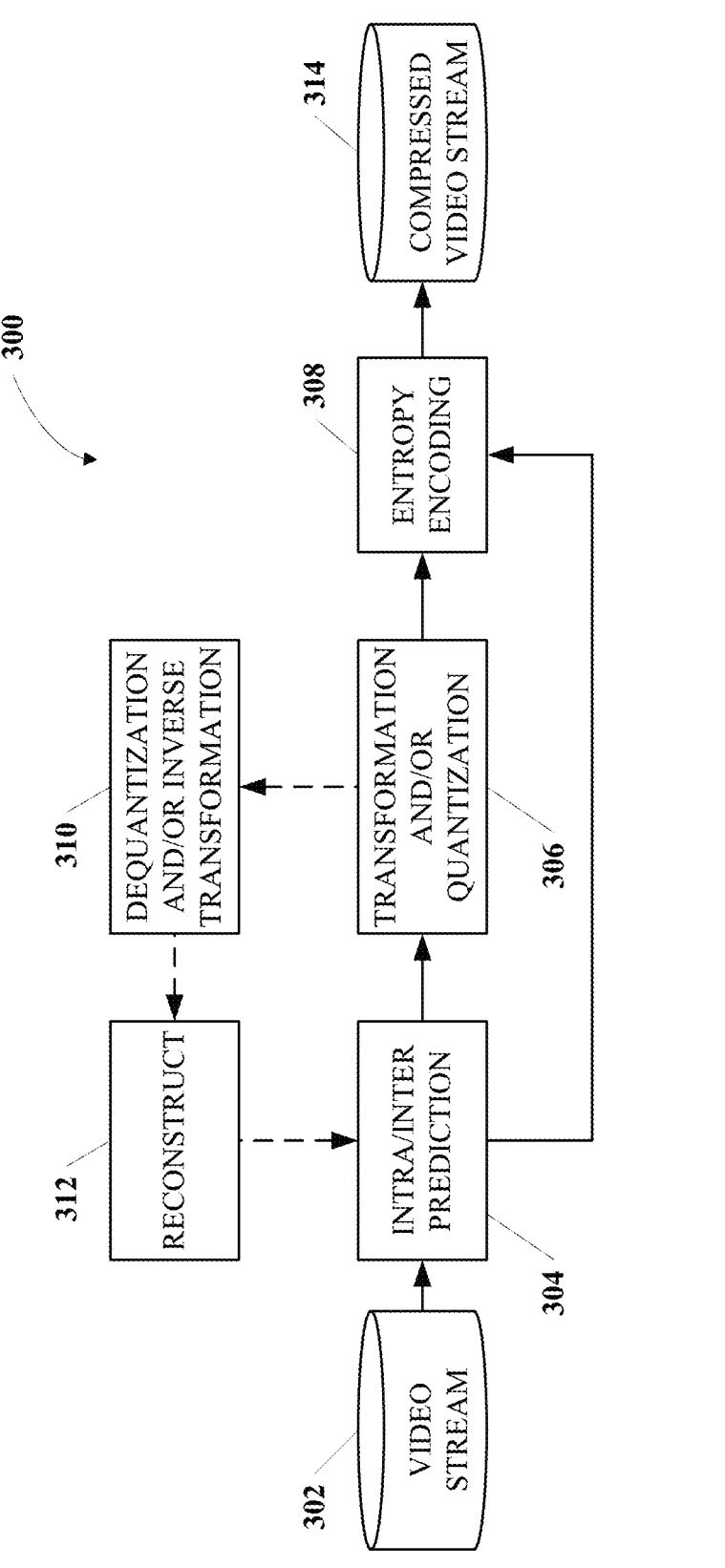
FIG. 3 is a diagram of an example encoding process that can be used according to implementations of this disclosure.

FIG. 3 is a diagram of an example process 300 for encoding a video stream 302 according to implementations of this disclosure. The video stream 302 can include a video sequence. The process 300 can be implemented as software and/or hardware modules in the system 100 in FIG. 1. For example, the process 300 can be implemented as modules included in an encoder (e.g., the apparatus 104 in FIG. 1). The process 300 includes operations 304-308 to produce as an output a compressed video stream 314 from a video stream 302. The example encoding process 300 (either the whole process or some stages) can be further modified when implementing the video tagging of FIG. 5 described below. In some instances, the process 300 may not be necessary for the implementations of video tagging.

Referring to the process 300 in FIG. 3, the video stream 302 is received by an encoder. The term "receive" as used herein can refer to receiving, inputting, acquiring, retrieving, obtaining, reading, accessing, or any action for inputting information or data in any manner. For example, the video stream 302 can be a video sequence that includes a series of video pictures (e.g., a current picture).

Generally, an encoding process can include one or more of the following stages or operations: a prediction stage (e.g., for intra-prediction or inter-prediction), a transformation stage (with or without quantization), and an entropy encoding stage. The aforementioned stages can be used to output the compressed video stream 314 from the video stream 302 in a forward path of the encoding process, as shown by the solid connection lines in FIG. 3: an intra/inter prediction stage 304, a transformation and/or quantization stage 306, and an entropy encoding stage 308.

At the intra/inter prediction stage 304, for intra-prediction, a current block of the current picture can be predicted using previously coded block(s) from the current picture. For inter-prediction, the current block of the current picture can be predicted using previously coded pictures as reference data. Previously coded pictures can include, for example, previously encoded and reconstructed pictures, also referred to as reference pictures. For example, ME and MC can be performed using the current picture and one or more reference pictures to generate motion data. A residual, which is the difference between a predicted block and the current block, can be further transformed, quantized, and/or entropy encoded.

In some implementations, optionally, a loop filter (not shown) can be additionally applied before the entropy encoding stage 308. The loop filter can reduce distortion (e.g., blocking artifacts) introduced by the video compression. Other information used to decode the resultant video bitstream can also be entropy encoded, such as the prediction mode, transformation type, quantization level, and loop filter parameters (e.g., filter strength).

In some implementations, the process 300 can further include a reconstruction path for reconstructing reference data to be used for predicting a future picture. For example, the reconstruction path (shown by the dashed connection lines in FIG. 3) can include the following stages: a dequantization and/or inverse transformation stage 310 and a reconstruction stage 312. The stages 310 and 312 can be used to ensure that both the encoder (e.g., the apparatus 104 in FIG. 1) and the decoder (e.g., the apparatus 102 in FIG. 1) can use the same reference data for prediction. In some implementations, optionally, a loop filter (not shown) can be additionally applied after the stage 312. In other implementations, the reconstructed picture can be used without using the loop filter. The reconstruction can be similar to a reconstruction stage in a decoding process (e.g., stage 410 in FIG. 4).

It should be noted that other variations of the encoding process can be used to encode the video sequence. The encoding process can be performed in different orders, combined into fewer stages, and/or divided into more stages. For example, quantization or transform can be optional in some implementations. As an example, a non-transform-based encoder can quantize the residual data without transformation.

Figure 4:
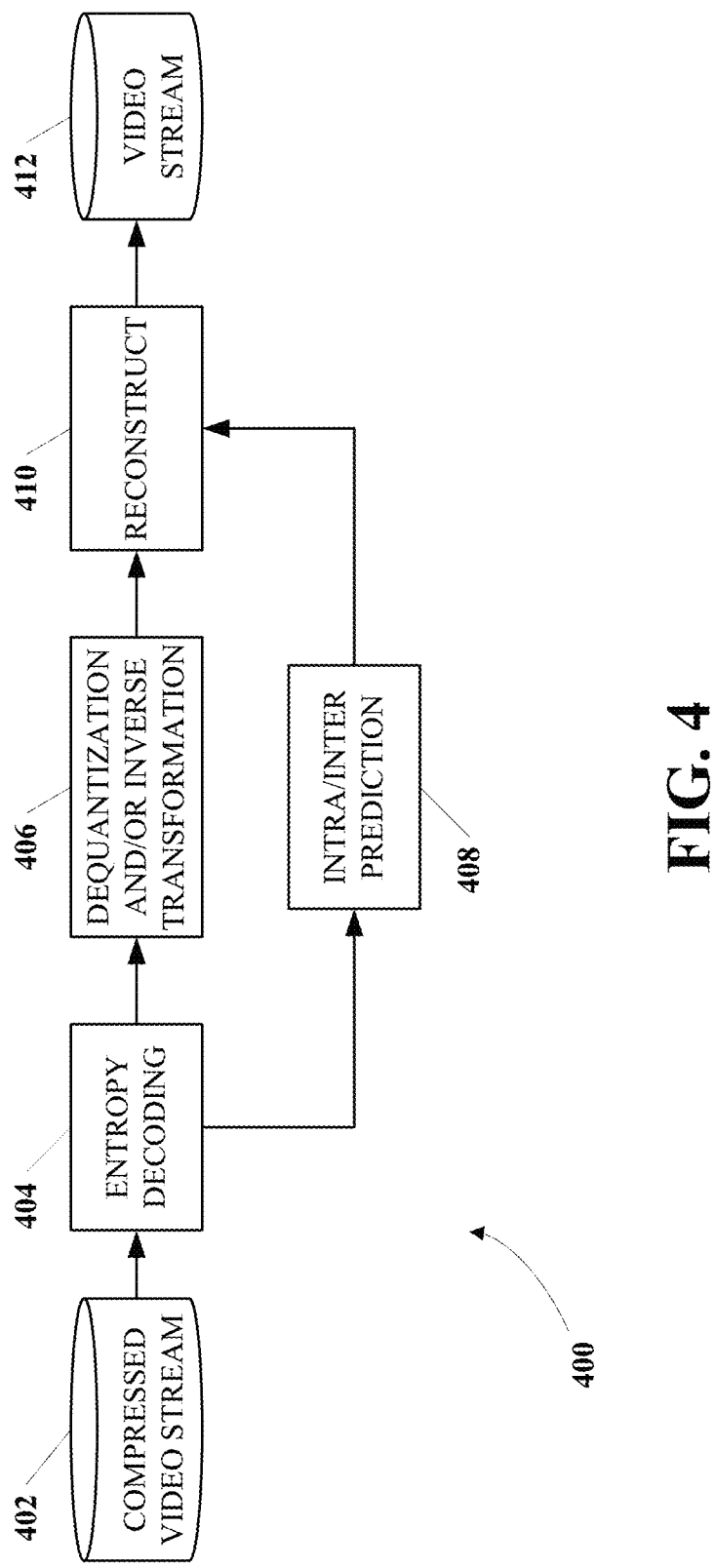
FIG. 4 is a diagram of an example decoding process that can be used according to implementations of this disclosure.

FIG. 4 is a diagram of an example process 400 that can be used to decode a compressed video stream according to implementations of this disclosure. The process 400 can be implemented as software and/or hardware modules in the system 100 in FIG. 1. For example, some or all stages of the process 400 can be implemented as software or hardware modules included in the system 100 by a decoder (e.g., the apparatus 102). The decoder can be implemented by program codes stored in memory (e.g., the memory 110). The program codes can include computer-readable instructions that, when executed by a processor (e.g., the processor 108), cause the decoder to decode a compressed video stream in the manner described in FIG. 4. The decoder can also be implemented as specialized hardware included in an apparatus (e.g., the apparatus 102). For example, the decoder can be a hardware decoder. The process 400 includes operations 404-410 to reconstruct a video stream 412 from a compressed video stream 402. In addition, the example decoding process 400 (either the whole process or some stages) can be modified when implementing the video tagging of FIG. 5 described below.

Generally, when decoding a compressed video stream, the decoding process is similar to the reconstruction path of the video encoding process. The process 400, similar to the reconstruction path of the process 300 discussed above, can include the following stages: an entropy decoding stage 404, a dequantization and/or inverse transformation stage 406, an intra/inter prediction stage 408, and a reconstruction stage 410. The reconstructed picture can be used as future reference data for processing a future picture successive to the current picture. In addition to being outputted in the video stream 412, the reconstructed picture can also be stored in a buffer (e.g., in the memory 110 in FIG. 1) to be used as the future reference data. In some implementations, the reconstructed picture can be filtered using a loop filter (not shown). Other structural variations of the process 400 can be used to decode the compressed video stream 402.

Figure 5:
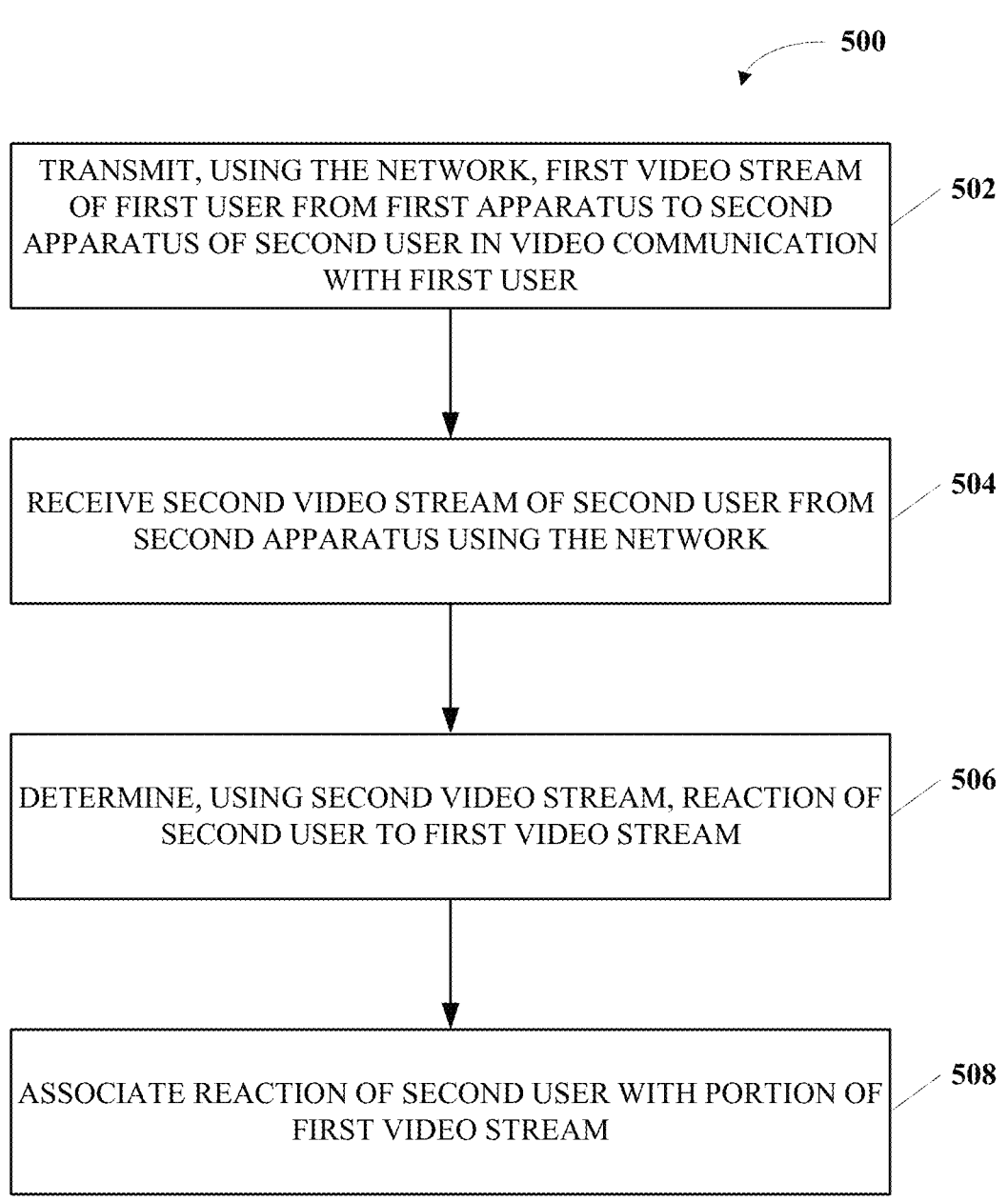
FIG. 5 is a flowchart of an example process for tagging a video according to implementations of this disclosure.

FIG. 5 is a flowchart of an example process 500 for tagging a video according to implementations of this disclosure. The process 500 can be implemented as software and/or hardware modules in the system 100 in FIG. 1. For example, the process 500 can be implemented as software modules of a server (e.g., the server 124). The process 500 can also be implemented as software modules stored in a memory (e.g., the memory 110) as instructions and/or data executable by a processor (e.g., the processor 108) of an end-user apparatus (e.g., the apparatus 102). The process 500 can also be implemented in hardware as a specialized chip storing instructions executable by the specialized chip.

For example, the specialized chip can include a special hardware acceleration module.

At operation 502, a first video stream of a first user is transmitted from a first apparatus to a second apparatus of a second user. The second user can be in video communication with the first user. The first video stream can be transmitted using a network (e.g., the network 106 in FIG. 1). For example, the first apparatus can be the apparatus 102, and the second apparatus can be the apparatus 104. The first apparatus can include a first encoder for encoding the first video stream. The second apparatus can include a second decoder for decoding the first video stream.

At operation 504, a second video stream of the second user can be received from the second apparatus using the network. The second apparatus can include a second encoder for encoding the second video stream. The first apparatus can include a first decoder for decoding the second video stream. The second video can include information for determining reactions of the second user to the first video (e.g., the video quality of the first video).

At operation 506, a reaction of the second user to the first video stream is determined using the second video stream. For example, the reaction of the second user can be determined by the first apparatus. For another example, the reaction of the second user can be determined by a server (e.g., the server 124) that is connected (e.g., directly connected) to the first apparatus. More details of determining the reaction will be detailed in the description in relation to FIGS. 6 and 7.

In some implementations, a decoded picture can be determined from decoded pictures of the second video stream. For example, the first decoder of the first apparatus can decode the second video stream to obtain the decoded pictures. One or more of the decoded pictures can include information of the second user (e.g., pictures that include a head and/or a body part of the second user and/or audio that includes a voice of the second user). When the first video stream has had a video quality fluctuation (e.g., an improved video quality or a deteriorated video quality) at the second decoder of the second apparatus, such as due to network condition changes (e.g., an increased or decreased network bandwidth), the second user can have a reaction (e.g., a positive, negative, or neutral reaction) to the first video stream. Such a reaction can be included in the information of the second user (e.g., a facial expression change in the pictures that include the head of the second user, a body gesture change in the pictures that include the body part of the second user, and/or a tone change in the audio that includes the voice of the second user). The reaction of the second user to the first video stream can include, for example, an area of interest in the first video stream as identified by the second user. The area of interest can be identified, for example, by the second user pointing out an area of interest in the first video stream, or by analyzing the gaze of the second user. For example, the second user can actively point out the area of interest in the first video stream by touching an area on a touch screen that is displaying the first video stream, or the area of interest can be identified by the user orally naming or hand typing an entity in the first video stream. The entity can include, for example, an object in the first video stream, which can be determined by techniques for analyzing or annotating the first video stream. For another example, the area of interest can also be determined by analyzing the gaze of the second user. The position of the area of interest can be sent back to the first user so that the first apparatus can make the area coded with better coding quality. Based on the information of the second user included in the decoded pictures, the picture that includes the reaction of the second user in the second video stream and corresponds to the quality-fluctuated picture of the first video stream can be determined. The reaction of the second user can be determined by analyzing the decoded picture. The area of interest in the first video stream can be extracted, for example, directly or indirectly from the second video stream. For example, information about the area of interest in the first video stream can be carried in the header or SEI message associated with the second video stream, or in a message through a separate communication channel. The message carrying the area of interest information can be associated with the first video stream through, for example, time stamps. Other ways of analyzing the second video stream can also be used to determine the area of interest in the first video stream, such as the techniques described herein in connection with analyzing the reaction of the second user.

In some implementations, the reaction of the second user can be determined by analyzing the decoded picture and/or audio decoded from the second video stream. For example, by analyzing the decoded picture, a visual reaction (e.g., a facial expression or a gesture) of the second user can be determined from the decoded picture. For another example, by analyzing the decoded audio, an acoustic reaction (e.g., a characteristic of speech) of the second user can be determined from the decoded audio. By analyzing the visual and acoustic reactions, a behavioral reaction (e.g., a gesture, a facial expression, a verbal expression, or a characteristic of speech) and/or an emotional reaction (e.g., an emotion or mood) of the second user can be inferred. More details of determining the visual, acoustic, and inferred reaction will be detailed in the descriptions in relation to FIGS. 8 and 9.

At operation 508, the reaction of the second user is associated with the first video stream. For example, the reaction can be associated with the first video stream by the first apparatus. For another example, the reaction can be associated with the first video stream by a server (e.g., the server 124) that is connected (e.g., directly connected) to the first apparatus. The reaction of the second user (e.g., the acoustic reaction, the gesture, the gaze or the face expression) can be used to identify the area of interest in the first video stream. The position of the area of interest can be sent back to the first user so that the first apparatus can make the area coded with better quality. Information about the position of the area of interest in the first video stream can be, as previously described, determined from the second video stream in various ways, such as directly from header information or SEI message associated with the second video stream, or from a separate message channel (e.g., with timestamps), or can be inferred or otherwise determined from the second video stream by some analyzing techniques, such as the ones described herein. More details of associating the reaction will be detailed in the descriptions in relation to FIGS. 6 and 7.

The reaction can be stored as tags associated with the first video stream. In other words, the first video stream can be stored as tagged video data (e.g., naturalistic video data). Multiple reactions of the second user can be determined and associated with multiple portions of the first video stream, in which the real-time monitoring and measuring of the video quality in accordance with subjective measures can be implemented.

In some implementations, the reaction of the second user can be associated with a portion of the first video stream based on timestamps. The decoded picture can be associated with a first timestamp (e.g., a local time at the second apparatus). For example, when the portion of the first video stream is displaying on a screen of the second apparatus, the second user can have a reaction to such displaying. The first timestamp can be generated by a clock of the second apparatus and associated with a picture of the second video stream. The picture can be indicative of the second user having the reaction. In other words, the first timestamp reflects a time when the second user reacts after seeing the decoded portion of the first video stream. For ease of explanation without causing ambiguity, the "first time-stamp" will be interchangeably referred to as a "reaction timestamp" hereinafter.

In some cases, the second user can be assumed to have an instant reaction to the changed video quality (referred to as an "instant-reaction assumption"). Under the instant-reac-tion assumption, the reaction timestamp can be associated with a picture of the second video stream reflecting the time when the portion of the first video stream is decoded and displayed to the second user. In some cases, the second user can be assumed to take a small duration of time (referred to as "reaction time") to detect changed video quality (referred to as a "non-instant-reaction assumption"). Under the non-instant-reaction assumption, the reaction timestamp can be associated with a picture of the second video stream reflect-ing the time when the second user reacts, which is later by a duration of the reaction time than the time when the portion of the first video is displayed to the second user. The reaction time can be a predetermined time interval.

In some implementations, the reaction timestamp can be encoded into the second video stream and transmitted. In some implementations, if the reaction timestamp is not encoded into the second video stream, it can be transmitted through an out-of-band message to the first apparatus or a server connected to the first apparatus (e.g., an edge server directly connected to the first apparatus).

The portion of the first video stream can also be associated with a second timestamp (e.g., a local time at the first apparatus). When the first encoder is encoding the first video stream, the second timestamp can be generated by a clock of the first apparatus and associated with the portion of the first video stream by the first encoder. For ease of explanation without causing ambiguity, the "second timestamp" will be interchangeably referred to as an "encoding timestamp" hereinafter. In some implementations, the encoding time-stamp can be a timestamp of a picture (e.g., the first picture, the middle picture, or the last picture) included in the portion of the first video stream. In some implementations, the encoding timestamp can be an average value of timestamps of multiple pictures (e.g., the first and last pictures) included in the portion of the first video stream. In some implemen-tations, the encoding timestamp can be encoded into the first video stream and transmitted. In some implementations, if the encoding timestamp is not encoded into the first video stream, it can be transmitted through an out-of-band mes-sage to the second apparatus or a server (e.g., an edge server) connected (e.g., directly connected) to the second apparatus.

Based on the reaction and encoding timestamps, the reaction of the second user can be associated with the portion of the first video stream. For example, for the purpose of determining the reaction of the second user, the time for transmitting the first video stream from the first apparatus and decoding it at the second apparatus can be assumed to be zero (referred to as an "instant-transmission assumption"). Under the instant-transmission assumption, the clock of the first encoder of the first apparatus can be assumed to be synchronized with the clock of the second decoder of the second apparatus. In other words, the time of encoding the portion of the first video stream at the first apparatus is assumed to be the same as the time of decoding and displaying the portion of the first video stream at the second apparatus. In some implementations, if a difference between the time of encoding the portion of the first video stream at the first apparatus and the time of decoding and displaying the portion of the first video stream at the second apparatus is less than a predetermined threshold, these two times can be deemed as "the same."

For example, under the instant-transmission assumption and the instant-reaction assumption, the reaction of the second user occurs at the same time as decoding and displaying the portion of the first video stream. When the reaction timestamp is determined (e.g., from decoding the second video stream) or received (e.g., from the out-of-band message associated with the second video stream), the first video stream can be searched to identify the portion having a timestamp that mirrors (i.e., is less than a predetermined threshold or the same as) the reaction timestamp. In other words, when a portion of the first video stream having an encoding timestamp that mirrors (i.e., is less than a prede-termined threshold or the same as) the reaction timestamp is determined, the reaction of the second user can be associated with the portion of the first video stream. That is, one or more tags indicative of the reaction of the second user can be associated with the portion of the first video stream. In some implementations, the association of the tags indicative of the reaction of the second user can be performed at the first apparatus or the edge server of the first apparatus. In some implementations, the association of the tags indicative of the reaction of the second user can be performed at the second apparatus or the edge server of the second apparatus.

For another example, under the instant-transmission assumption and the non-instant-reaction assumption, the reaction of the second user occurs at a time later by a duration of the reaction time than the time of decoding and displaying the portion of the first video stream. In other words, when the reaction timestamp is determined or received, the first video stream can be searched to identify a portion that has a timestamp within a temporal range (or difference) of the reaction timestamp. The temporal range can be predetermined, and can be a duration of time greater than, equal to, or less than the reaction time. For example, the temporal range can be set as less than a predetermined threshold (e.g., three times the reaction time). Portions (e.g., pictures) of the first video stream having timestamps within the temporal range can be identified and associated with the reaction. In some implementations, for benefit of instant usage of the tagged video (e.g., adjusting the encoding parameters at the first apparatus based on the reaction of the second user), the association of the tags indicative of the reaction of the second user can be performed at the first apparatus or the edge server of the first apparatus. In some implementations, for benefits of faster and more accurate association of the tags, the association of the tags indicative of the reaction of the second user can be performed at the second apparatus or the edge server of the second apparatus. For example, the reaction of the second user can be detected and directly associated with the first video stream at the second apparatus. The detection of the reaction of the second user can be performed by directly analyzing the captured pictures of a second video sequence of the second user before encoding it to the second video stream.

For another example, the time for transmitting the first video stream from the first apparatus and decoding it at the second apparatus can be assumed to be non-zero (referred to as "non-instant-transmission assumption"). Under the noninstant-transmission assumption, synchronization between the clock of the first encoder of the first apparatus and the clock of the second decoder of the second apparatus can be implemented by various methods. For example, a time service (e.g., an Internet time server) commonly used by the first apparatus and the second apparatus can be utilized for the clock synchronization. Under the non-instant-transmission assumption, the reaction of the second user can occur at a time later by a time interval (referred to as a "delay") than the time of decoding and displaying the portion of the first video stream, no matter whether the instant-reaction assumption is used. The delay can be caused by various factors, such as, for example, transmission, decoding, rendering, or any other operations of the apparatuses and/or network that takes time to complete. The delay can be predetermined, and can be the same as or different from the duration of the reaction time. Similarly, portions (e.g., pictures) of the first video stream having timestamps within the time interval can be identified and associated with the reaction.

For example, under the non-instant-transmission assumption and the non-instant-reaction assumption, the reaction of the second user occurs at a time later by a sum of the reaction time and the delay (the sum can be referred to as D) than the time of decoding and displaying the portion of the first video stream. When the reaction timestamp (referred to as T) is determined or received, the first video stream can be searched to identify a portion that has a target timestamp, and the target timestamp is T-D. In some implementations, for benefit of instant usage of the tagged video (e.g., adjusting the encoding parameters at the first apparatus based on the reaction of the second user), the association of the tags indicative of the reaction of the second user can be performed at the first apparatus or the edge server of the first apparatus. In some implementations, for benefits of faster and more accurate association of the tags, the association of the tags indicative of the reaction of the second user can be performed at the second apparatus or the edge server of the second apparatus. For example, if the association is performed at the second apparatus or the edge server of the second apparatus, the delay can be minimal, and D can be deemed as substantially 0. In this case, the tags can be associated with the first portion with the target timestamp immediately.

In some implementations, optionally, after the operation 508, the tagged video data can be used to improve user experience. For another example, the reaction of the second user can be determined periodically. The period can be flexible or fixed. Based on the monitored reaction of the second user, it can be determined whether the video quality of the first video stream is being improved or deteriorated in real time. Accordingly, a parameter for encoding the first video stream can be updated at the first apparatus (e.g., at the first encoder). The parameter can include any combination of a bitrate, a frame rate, a picture resolution, a forward error correction (FEC) ratio, or any suitable parameter for video encoding and transmission. For example, the reaction of the second user (e.g., the acoustic reaction, the gesture, the gaze or the face expression) can be used to identify the area of interest in the first video stream, and the first apparatus (e.g., the first encoder) can encode the area of interest with better coding quality. For example, the area of interest can be determined, for example, by the second user pointing out an area of interest in the first video stream, or by analyzing the gaze of the second user. For example, the second user can actively point out the area of interest in the first video stream by touching the area on the touch screen displaying the first video stream, or orally naming or hand typing the entity such as one or more objects of interest in the first video stream. Information about the area of interest, such as the position of the area of interest, can be sent back to the first user so that the first apparatus can make the area coded with better coding quality. Once the area of interest is identified, a sending device such as the first apparatus can encode the area of interest with better coding quality. The area of interest in the first video stream can be extracted, for example, directly or indirectly from the second video stream. For example, information about the area of interest in the first video stream can be carried in the header or SEI message associated with the second video stream, or in a message through a separate communication channel. The message carrying the area of interest information can be associated with the first video stream through, for example, time stamps. Other ways of analyzing the second video stream can also be used to determine the area of interest in the first video stream, such as the techniques described herein in connection with analyzing the reaction of the second user.

In some implementations, the tagged video data can be stored in a database (e.g., a server in the network 106). The database can store a large amount of tagged video data collected from many users. The tags of those tagged video data can include positive, negative, or neutral feedback of the video quality from the users.

For example, the tagged video data can be used to train video encoders, such as an adaptive encoder capable of automatically adjusting encoding parameters (e.g., in real-time) to optimize video quality in accordance with objective measures of network conditions and/or real-time monitored subjective measures (e.g., user reactions to video quality of video streams of their communication counterparts). The training of such video encoders can use a machine learning technique (e.g., a supervised learning technique), such as a neural network technique. For example, the tagged video data can be used as ground truth labels for a supervised learning technique. It should be noted that the tagged video data can be used in various ways to improve user experience and is not limited to the above examples.

Figure 6:
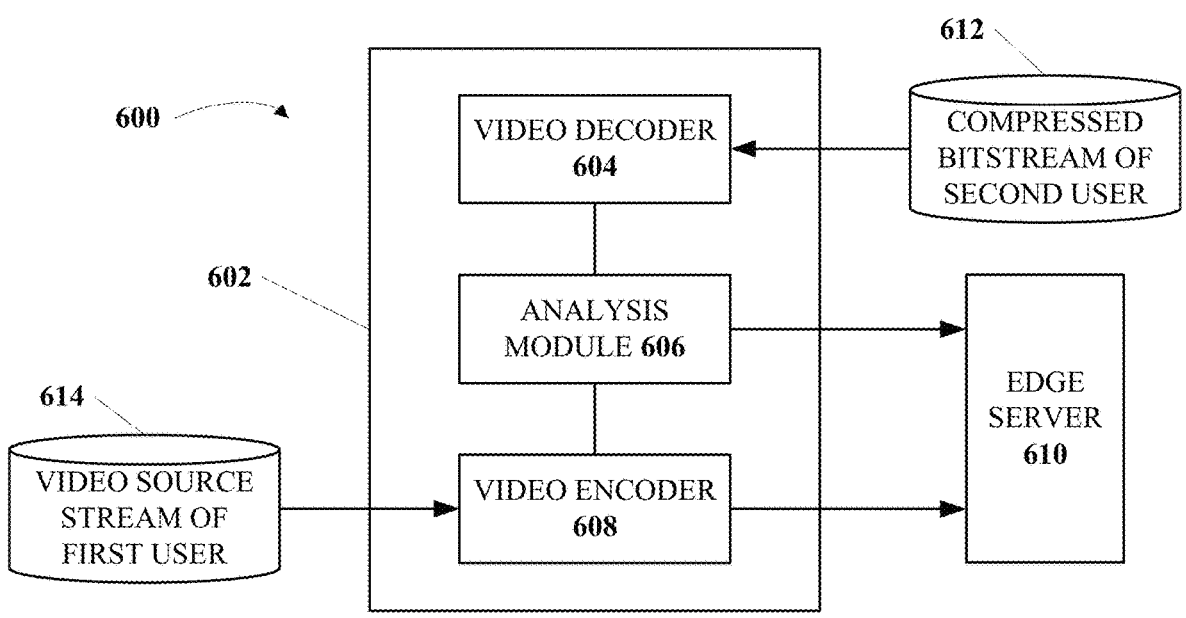
FIG. 6 is a diagram of an example system for tagging a video according to implementations of this disclosure.

FIG. 6 is a diagram of an example system 600 for tagging a video according to implementations of this disclosure. The system 600 includes an apparatus 602 and an edge server 610. The apparatus 602 can be an end-user apparatus, such as the apparatus 102 or the apparatus 104 in FIG. 1. The edge server 610 (e.g., the server 124 or the server 126) directly connects to the apparatus 602. The edge server 610 can connect to the apparatus 602 via a network, such as the network 106.

The apparatus 602 can include various software and/or hardware modules, including a video decoder 604, an analysis module 606, and a video encoder 608. In some implementations, those modules can be implemented as software, such as instructions stored in a memory (e.g., the memory 110 or the memory 118), which instructions when executed by a processor (e.g., the processor 108 or the processor 116) can become executable to perform operations (e.g., the operations 502-508). In some implementations, the modules can be implemented as hardware, such as a specialized chip (e.g., an ASIC) that can perform predetermined operations (e.g., the operations 502-508). It should be noted that the modules in FIG. 6 are for the purpose of illustration only and are not limited to the illustrated examples. For example, the video decoder 604, the analysis module 606, and the video encoder 608 can be combined, separated, or associated in any suitable way to achieve the same or similar functions without creative effort.

The video encoder 608 can be configured to receive and encode a video source stream 614 of a first user. For example, the video source stream 614 can be a video sequence. The video sequence can be captured by a video input module (not shown), such as a camera. The camera can be integrated into the apparatus 602 (e.g., a smartphone or a tablet computer). The camera can also be independent but connected to the apparatus 602 (e.g., a webcam connected to a PC). The video encoder 608 can encode the video source stream 614 into a first bitstream, and the apparatus 602 can transmit the first bitstream to a second user via the network, such as by performing the operation 502 of the process 500. In some implementations, the first bitstream can be transmitted to and forwarded by the edge server 610 (e.g., using the communication device 114 or the communication device 122) to the second user.

The video decoder 604 can be configured to receive and decode the compressed bitstream 612 of a second user, such as by performing the operation 504 of the process 500. The first user and the second user can be in real-time video communications (e.g., a video call, a video conference, or a live broadcasting event). In some implementations, the compressed bitstream 612 can be forwarded by the edge server 610 from a second end-user apparatus (not shown). In some implementations, the compressed bitstream can be forwarded by another server (not shown) in the network from the second end-user apparatus. The video decoder 604 can decode pictures and/or audio from the compressed bitstream 612. The decoded pictures and/or audio can be displayed and played to the first user for real-time video communications, and can be utilized as input for the analysis module 606.

The analysis module 606 can be configured to determine or extract naturalistic data (e.g., a reaction) of the second user from the decoded pictures and/or audio of the compressed bitstream 612, such as by performing the operation 506 of the process 500. The naturalistic data of the second user can reflect reactions or emotions of the second user to the video quality of a portion of the first bitstream that has been previously transmitted and displayed to the second user. Such naturalistic data can be periodically (e.g., in a fixed or flexible period) analyzed and determined by the analysis module 606. More details of the analysis module 606 will be described in relation to FIGS. 8 and 9. The naturalistic data can be transmitted (e.g., using the communication device 114 or the communication device 122) to the edge server 610.

In the edge server 610, the naturalistic data can be synchronized or aligned with the first bitstream. For example, such synchronization or alignment can be completed based on timestamps. The instant-transmission assumption and instant-reaction assumption can be adopted or not adopted in the synchronization, depending on various implementations. After synchronization, the naturalistic data can be associated with the first bitstream to form tagged video data. The tagged video data can be stored in the edge server 610 (e.g., in a database) or another server (not shown) in the network.

In some implementations, based on the tagged video data, a parameter of the video encoder 608 can be updated to improve user experience. For example, if the network traffic deteriorates, packet loss of a portion of the first bitstream can occur at the second end-user apparatus. The second user can have negative reactions captured in the compressed bitstream 612. The analysis module 606 can extract and determine the naturalistic data that includes the negative reactions of the second user to the portion of the first bitstream. The determined negative reactions can be transmitted to the edge server 610, in which the negative reactions can be synchronized and associated with the portion of the first bitstream that has been stored therein. Also, based on the negative reactions, a parameter of the video encoder can be updated to adapt the video encoding of the first bitstream to the deteriorated network conditions, such as by lowering a bitrate, a frame rate, or a resolution, or by increasing an FEC ratio. The parameter of the video encoded 608 can be updated, for example, for an area of interest identified in the first bitstream according to the above descriptions in connection with FIG. 5.

Figure 7:
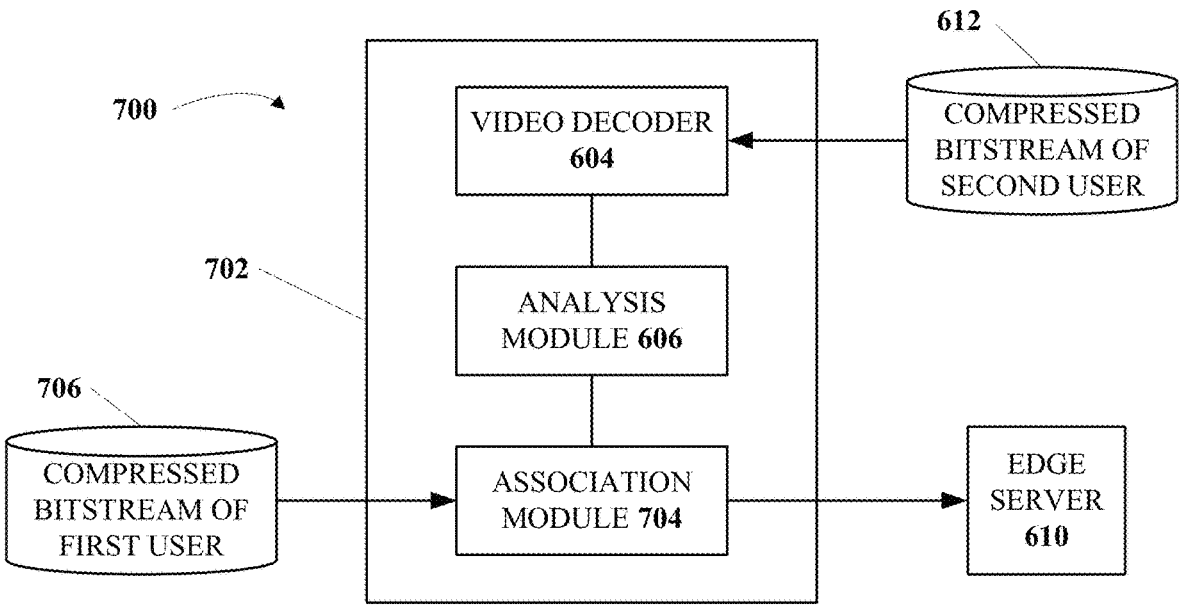
FIG. 7 is a diagram of another example system for tagging a video according to implementations of this disclosure.

FIG. 7 is a diagram of an example system 700 for tagging a video according to implementations of this disclosure. The system 700 includes an apparatus 702 and the edge server 610. The apparatus 702 can be an end-user apparatus, such as the apparatus 102 or the apparatus 104 in FIG. 1. The apparatus 702 can include various software and/or hardware modules, including the video decoder 604, the analysis module 606, and an association module 704. The modules of the apparatus 702 can be implemented similarly to the modules of the apparatus 602.

The video decoder 604 can be configured to receive the compressed bitstream 612 of the second user and decode it to pictures and audio. The analysis module 606 can be configured to take the decoded pictures and audio as input to determine the naturalistic data of the second user. However, the naturalistic data is not transmitted to the edge server 610 in the system 700. The naturalistic data can be inputted to the association module 704.

The association module 704 can be configured to receive the naturalistic data and a compressed bitstream 706 of the first user. The compressed bitstream 706 can be encoded by an encoder. The encoder can be implemented as a software or hardware module of the apparatus 702, such as the video encoder 608. The encoder can receive a video sequence (e.g., the video source stream 614) of the first user and encode it to be the compressed bitstream 706. In the association module 704, the naturalistic data can be synchronized or aligned with the compressed bitstream 706. After synchronization, the naturalistic data can be associated with the first bitstream to form tagged video data, such as by performing the operation 508 of the process 500. The tagged video data can be transmitted to the edge server 610. In some implementations, the tagged video data can be stored in the edge server 610 (e.g., in a database) or another server (not shown) in the network. Based on the tagged video data, a parameter of the encoder can be updated to improve user experience. The parameter of the encoder can be updated, for example, for an area of interest identified in the first bitstream according to the above descriptions in connection with FIG. 5.

Figure 8:
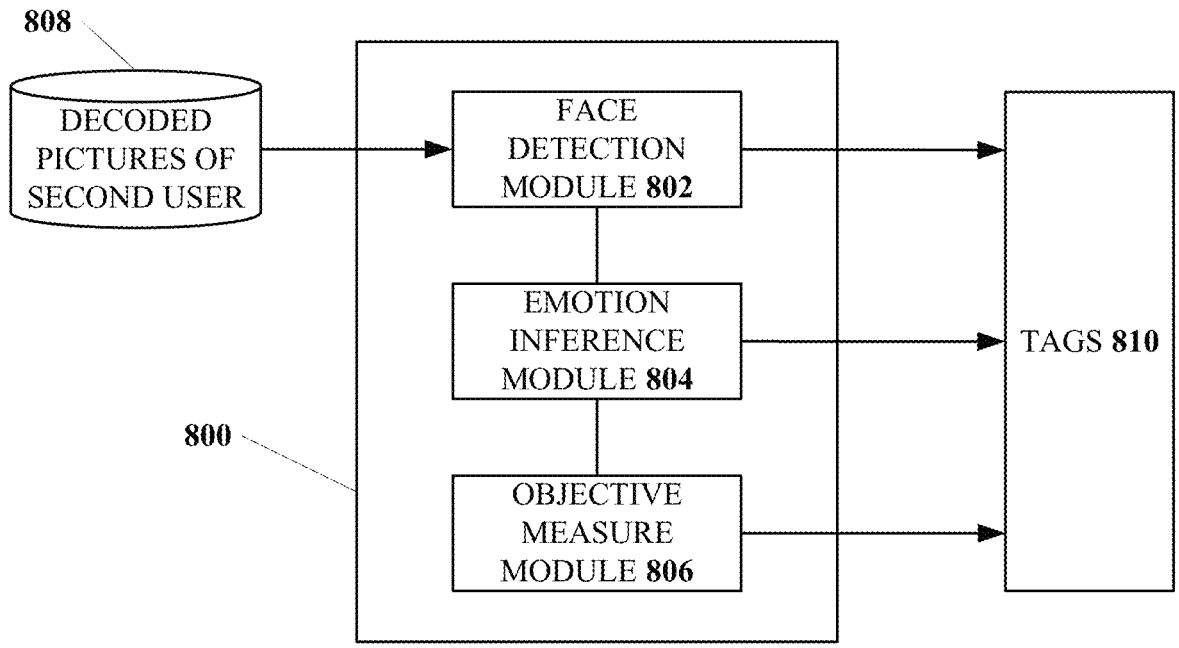
FIG. 8 is a diagram of an example module for tagging a video according to implementations of this disclosure.

FIG. 8 is a diagram of an example module 800 for tagging a video according to implementations of this disclosure. In some implementations, the module 800 can be implemented as the analysis module 606 in FIGS. 6-7. The module 800 can further include various software and/or hardware modules, including a face detection module 802, an emotion inference module 804, and an objective measure module 806. In some implementations, those modules can be implemented as software, such as instructions stored in a memory (e.g., the memory 110 or the memory 118), which instructions when executed by a processor (e.g., the processor 108 or the processor 116) can become executable to perform operations (e.g., the operations 502-508). In some implementations, the modules can be implemented as hardware, such as a specialized chip (e.g., an ASIC) that can perform predetermined operations (e.g., the operations 502-508). It should be noted that the modules in FIG. 8 are for the purpose of illustration only and are not limited to the illustrated examples. For example, the face detection module 802, the emotion inference module 804, and the objective measure module 806 can be combined, separated, or associated in any suitable way to achieve the same or similar functions without creative effort.

In FIG. 8, the face detection module 802 can be configured to receive decoded pictures 808 of the second user as input to recognize a face of the second user. In some implementations, the face detection module 802 can be configured to further determine a facial expression from the recognized face. The decoded pictures 808 can be outputted from a decoder (e.g., the video decoder 604). The emotion inference module 804 can be configured to infer an emotion of the second user. In some implementations, the input of the emotion inference module 804 can include any combination of the decoded pictures 808, the face recognized by the face detection module 802, and the facial expression recognized by the face detection module 802.

In some implementations, the face detection module 802 and the emotion inference module 804 can be implemented as software or hardware modules using a machine learning technique, such as a supervised or unsupervised learning technique. For example, the learning technique can include a convolutional neural network (CNN) technique, a k-nearest neighbors (k-NN) technique, a support vector machine (SVM) technique, or any combination thereof.

In some implementations, the face detection module 802 and the emotion inference module 804 can be implemented as software modules using a CNN classifier. The CNN classifier can be pre-trained. The CNN classifier can take the decoded pictures 808 as input, and output the recognized face, the recognized facial expression, and/or the inferred emotion. In some implementations, the face detection module 802 and the emotion inference module 804 can use different CNN classifiers. In some implementations, when the face detection module 802 and the emotion inference module 804 use different CNN classifiers, the first convolutional layers of the CNN classifiers can be shared by the two modules. In some implementations, the face detection module 802 and the emotion inference module 804 can use the same CNN classifier.

The objective measure module 806 can be configured to determine objective measures of the network conditions, such as a transmission delay time, a packet loss ratio, a picture resolution, and a coding bitrate.

One or more of the outputs of the face detection module 802, the emotion inference module 804, and the objective measure module 806 can be outputted as tags 810. The tags 810 can be associated (e.g., by the edge server 610 in FIG. 6 or the association module 704 in FIG. 7) with the video stream of the first user (e.g., the first video bitstream or the compressed bitstream 706). It should be noted that the tags 810 can include subjective measures (e.g., the output of the face detection module 802 and the emotion inference module 804) and/or objective measures (e.g., the output of the objective measure module 806) for generating tagged video data.

Figure 9:
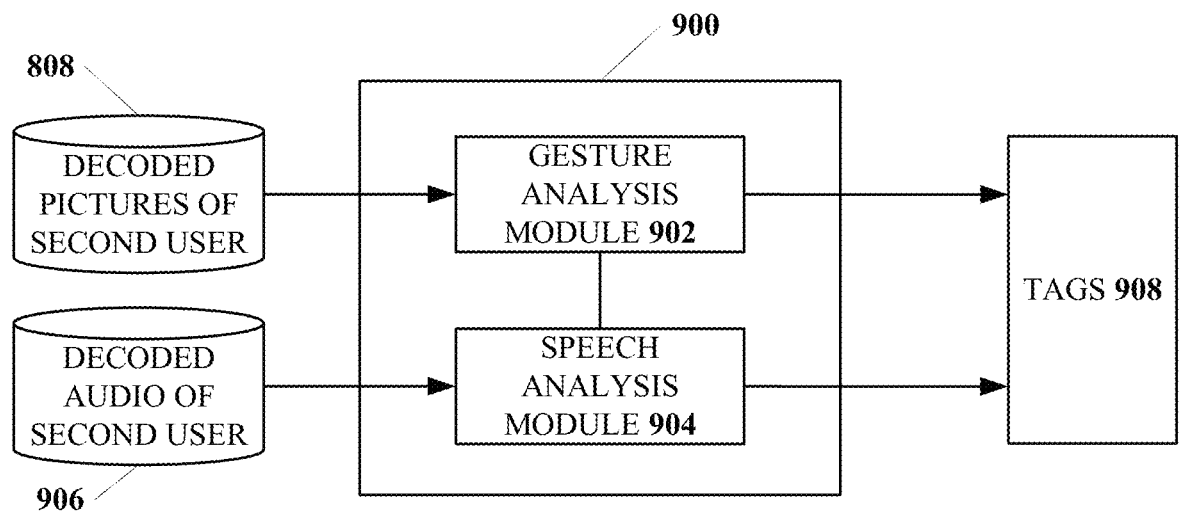
FIG. 9 is a diagram of another example module for tagging a video according to implementations of this disclosure.

FIG. 9 is a diagram of an example module 900 for tagging a video according to implementations of this disclosure. In some implementations, the module 900 can be implemented as the analysis module 606 in FIGS. 6-7. In some implementations, the module 900 can be implemented as an optional supplement to the module 800. The module 900 can further include various software and/or hardware modules, including a gesture analysis module 902 and a speech analysis module 904. In some implementations, those modules can be implemented as software, such as instructions stored in a memory (e.g., the memory 110 or the memory 118), which instructions when executed by a processor (e.g., the processor 108 or the processor 116) can become executable to perform operations (e.g., the operations 502-508). In some implementations, the modules can be implemented as hardware, such as a specialized chip (e.g., an ASIC) that can perform predetermined operations (e.g., the operations 502-508). It should be noted that the modules in FIG. 9 are for the purpose of illustration only and are not limited to the illustrated examples. For example, the gesture analysis module 902 and the speech analysis module 904 can be combined, separated, or associated in any suitable way to achieve the same or similar functions without creative effort.

The gesture analysis module 902 can be configured to detect and analyze gestures of the second user. The gesture analysis module 902 can take the decoded pictures 808 as input. The gestures can include, for example, a hand wave, a head shake, a nod, a shoulder shrug, or any signaling gesture indicative of positive or negative feedback. For example, the gestures can include a gaze or a facial expression of the second user, or pointing out an area of interest such as by touching the area on the touch screen. In some implementations, the gesture analysis module 902 can be implemented as a software or hardware module using a machine learning technique, such as a supervised or unsupervised learning technique. For example, the learning technique can include a convolutional neural network (CNN) technique, a k-nearest neighbors (k-NN) technique, a support vector machine (SVM) technique, or any combination thereof.

The speech analysis module 904 can be configured to detect and analyze characteristics and meanings of the speech of the second user. The speech analysis module 904 can take the decoded audio 906 of the second user as input. The decoded audio 906 can be decoded from a video stream of the second user (e.g., the compressed bitstream 612 in FIGS. 6-7) and associated with the decoded pictures 808. The characteristics of the speech of the second user can include, for example, a pitch, a tone, a speech rate, loudness, or any signaling characteristic indicative of positive or negative feedback. In some implementations, the output of the speech analysis module 904 can be further analyzed to infer an emotion of the second user, such as by using the emotion inference module 804 or a different emotion inference technique or module.

In some implementations, the speech analysis module 904 can further determine a semantic meaning of the speech of the second user. The semantic meaning can be an explicit meaning or an implicit meaning. In some implementations, the speech analysis module 904 can be implemented as a software or hardware module using an automatic speech recognition (ASR) technique, a natural language processing (NLP) technique, an artificial intelligence (AI) technique, or any combination thereof. For example, the second user orally naming one or more objects of interest in the video stream can be determined by the speech analysis module 904.

One or more of the outputs of the gesture analysis module 902 and the speech analysis module 904 can be outputted as tags 908. The tags 908 can be associated (e.g., by the edge server 610 in FIG. 6 or the association module 704 in FIG.

7) with the video stream of the first user (e.g., the first video bitstream or the compressed bitstream 706).

As described above, a person skilled in the art will note that all or a portion of the aspects of the disclosure described herein can be implemented using a general-purpose computer/processor with a computer program that, when executed, carries out any of the respective techniques, algorithms, and/or instructions described herein. In addition, or alternatively, for example, a special-purpose computer/processor, which can contain specialized hardware for carrying out any of the techniques, algorithms, or instructions described herein, can be utilized.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing, either singly or in combination.

The aspects of the disclosure described herein can be described in terms of functional block components and various processing operations. The disclosed processes and sequences may be performed alone or in any combination. Functional blocks can be realized by any number of hardware and/or software components that perform the specified functions. For example, the described aspects can employ various integrated circuit components, such as, for example, memory elements, processing elements, logic elements, look-up tables, and the like, which can carry out a variety of functions under the control of one or more microprocessors or other control devices. Similarly, where the elements of the described aspects are implemented using software programming or software elements, the disclosure can be implemented with any programming or scripting languages, such as C, C++, Java, assembler, or the like, with the various algorithms being implemented with any combination of data structures, objects, processes, routines, or other programming elements. Functional aspects can be implemented in algorithms that execute on one or more processors. Furthermore, the aspects of the disclosure could employ any number of conventional techniques for electronics configuration, signal processing and/or control, data processing, and the like. The words "mechanism" and "element" are used broadly and are not limited to mechanical or physical implementations or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media and can include RAM or other volatile memory or storage devices that can change over time. A memory of an apparatus described herein, unless otherwise specified, does not have to be physically contained in the apparatus, but is one that can be accessed remotely by the apparatus, and does not have to be contiguous with other memory that might be physically contained in the apparatus.

Any of the individual or combined functions described herein as being performed as examples of the disclosure can be implemented using machine-readable instructions in the form of code for operation of any or any combination of the aforementioned hardware. The computational codes can be implemented in the form of one or more modules by which individual or combined functions can be performed as a computational tool, the input and output data of each module being passed to/from one or more further modules during operation of the methods and systems described herein.

The terms "signal" and "data" are used interchangeably herein. Further, portions of the computing devices do not necessarily have to be implemented in the same manner. Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. Moreover, use of the term "an aspect" or "one aspect" throughout this disclosure is not intended to mean the same aspect or implementation unless described as such.

As used in this disclosure, the term "or" is intended to mean an inclusive "or" rather than an exclusive "or" for the two or more elements it conjoins. That is, unless specified otherwise or clearly indicated otherwise by the context, "X includes A or B" is intended to mean any of the natural inclusive permutations thereof. In other words, if X includes A; X includes B; or X includes both A and B, then "X includes A or B" is satisfied under any of the foregoing instances. Similarly, "X includes one of A and B" is intended to be used as an equivalent of "X includes A or B." The term "and/or" as used in this disclosure is intended to mean an "and" or an inclusive "or." That is, unless specified otherwise or clearly indicated otherwise by the context, "X includes A, B, and/or C" is intended to mean that X can include any combinations of A, B, and C. In other words, if X includes A; X includes B; X includes C; X includes both A and B; X includes both B and C; X includes both A and C; or X includes all of A, B, and C, then "X includes A, B, and/or C" is satisfied under any of the foregoing instances. Similarly, "X includes at least one of A, B, and C" is intended to be used as an equivalent of "X includes A, B, and/or C."

The use of the terms "including" or "having" and variations thereof herein is meant to encompass the items listed thereafter and equivalents thereof as well as additional items. Depending on the context, the word "if" as used herein can be interpreted as "when," "while," or "in response to."

The use of the terms "a" and "an" and "the" and similar referents in the context of describing the disclosure (especially in the context of the following claims) should be construed to cover both the singular and the plural. Furthermore, unless otherwise indicated herein, the recitation of ranges of values herein is intended merely to serve as a shorthand method of referring individually to each separate value falling within the range, and each separate value is incorporated into the specification as if it were individually recited herein. Finally, the operations of all methods described herein are performable in any suitable order unless otherwise indicated herein or otherwise clearly contradicted by the context. The use of any and all examples, or language indicating that an example is being described (e.g., "such as"), provided herein is intended merely to better illuminate the disclosure and does not pose a limitation on the scope of the disclosure unless otherwise claimed.

This specification has been set forth with various headings and subheadings. These are included to enhance readability and ease the process of finding and referencing material in the specification. These headings and subheadings are not intended, and should not be used, to affect the interpretation of the claims or limit their scope in any way. The particular implementations shown and described herein are illustrative examples of the disclosure and are not intended to otherwise limit the scope of the disclosure in any way.

All references, including publications, patent applications, and patents, cited herein are hereby incorporated by reference to the same extent as if each reference were individually and specifically indicated as incorporated by reference and were set forth in its entirety herein.

While the disclosure has been described in connection with certain embodiments and implementations, it is to be understood that the disclosure is not to be limited to the disclosed implementations but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for video communications, comprising:
transmitting, from a first apparatus using a network, a first video stream of a first user to a second apparatus of a second user, wherein the first user is in video communication with the second user;
receiving, from the second apparatus using the network, a second video stream of the second user;
determining, by a processor, a reaction of the second user to an area of interest in the first video stream using the second video stream; and
updating a parameter for encoding the area of interest in the first video stream at the first apparatus based on the reaction of the second user to the area of interest in the first video stream, wherein one or more tags associated with the reaction of the second user to the area of interest in the first video stream are used to train an adaptive encoder to automatically adjust the parameter for encoding the area of interest in the first video stream to optimize video viewing experiences based on the reaction of the second user.

2. The method of claim 1, further comprising:
associating the reaction of the second user to the area of interest in the first video stream using a reaction timestamp of a decoded picture of the second video stream and an encoding timestamp of the first apparatus of the first video stream.

3. The method of claim 2, wherein associating the reaction of the second user to the area of interest in the first video stream comprises:
determining, based on a first timestamp associated with the decoded picture, a portion of the first video stream associated with a second timestamp, wherein a temporal difference between the first timestamp and the second timestamp is less than a predetermined threshold; and
associating the reaction of the second user with the portion of the first video stream.

4. The method of claim 1, wherein the area of interest in the first video stream is determined by at least one of:
determining, from the second video stream, the second user touching an area associated with the area of interest on a screen displaying the first video stream, or orally naming or typing about an object in the first video stream; or
analyzing a gesture of the second user in the second video stream, and the reaction of the second user is analyzed to determine whether the reaction is a positive feedback, a neutral feedback or a negative feedback of the second user to the first video stream.

5. The method of claim 1, wherein the reaction of the second user is determined based on a visual reaction and an acoustic reaction of the second user determined from the second video stream.

6. The method of claim 5, wherein the reaction of the second user to the area of interest in the first video stream is determined by one of the first apparatus, a server in the network connected to the first apparatus, the second apparatus, or a server in the network connected to the second apparatus, and the reaction of the second user is an emotional reaction to the video viewing experiences of the first video stream inferred based on the visual reaction and the acoustic reaction of the second user from the second video stream.

7. The method of claim 1, wherein the video viewing experiences comprise at least one of a subjective user viewing experience or an objective user viewing experience.

8. The method of claim 7, wherein the objective user viewing experience comprises at least one of: a delay time, a packet loss ratio, a resolution change, a frame rate change, or a bitrate change, and the subjective user viewing experience comprises at least one of: user awareness of video quality, user viewing experience between communicating users, user ratings or user feedback.

9. An apparatus for video communications, comprising:
a processor; and
a memory coupled to the processor, the memory configured to store instructions which when executed by the processor become operational with the processor to:
transmit a first video stream of a first user to a second apparatus of a second user, wherein the first user is in video communication with the second user;
receive, from the second apparatus, a second video stream of the second user;
determine a reaction of the second user to an area of interest in the first video stream using the second video stream; and
update a parameter for encoding the area of interest in the first video stream based on the reaction of the second user to the area of interest in the first video stream, wherein one or more tags associated with the reaction of the second user to the area of interest in the first video stream are used to train an adaptive encoder to automatically adjust the parameter for encoding the area of interest in the first video stream to optimize video viewing experiences based on the reaction of the second user.

10. The apparatus of claim 9, wherein the memory comprising the instructions operational with the processor to determine the reaction of the second user to the first video stream further comprises instructions which when executed by the processor become operational with the processor to:

associate the reaction of the second user to the area of interest in the first video stream using a reaction timestamp of a decoded picture of the second video stream and an encoding timestamp of the first video stream.

11. The apparatus of claim 10, wherein the memory comprising the instructions operational with the processor to associate the reaction of the second user with the first video stream further comprises instructions which when executed by the processor become operational with the processor to:

determine, based on a first timestamp associated with the decoded picture, a portion of the first video stream associated with a second timestamp, wherein a temporal difference between the first timestamp and the second timestamp is less than a predetermined threshold; and associate the reaction of the second user with the portion of the first video stream.

12. The apparatus of claim 9, wherein the area of interest in the first video stream is determined by detecting, from the second video stream, the second user touching an area associated with the area of interest on a screen displaying the first video stream, or orally naming or typing about an object in the first video stream.

13. The apparatus of claim 9, wherein the reaction of the second user is determined based on a visual reaction and an acoustic reaction of the second user determined from the second video stream.

14. The apparatus of claim 13, wherein the reaction of the second user to the area of interest in the first video stream is determined by one of the apparatus, a server in a network connected to the apparatus, the second apparatus, and a server in the network connected to the second apparatus, and the reaction of the second user is an emotional reaction to the video viewing experiences of the first video stream inferred based on the visual reaction and the acoustic reaction of the second user from the second video stream.

15. The apparatus of claim 9, wherein the area of interest in the first video stream is determined by analyzing a gesture of the second user in the second video stream, and the reaction of the second user is analyzed to determine whether the reaction is a positive feedback, a neutral feedback or a negative feedback of the second user to the first video stream.

16. The apparatus of claim 9, wherein the video viewing experiences comprise at least one of a subjective user viewing experience or an objective user viewing experience.

17. The apparatus of claim 16, wherein the objective user viewing experience comprises at least one of: a delay time, a packet loss ratio, a resolution change, a frame rate change, or a bitrate change, and the subjective user viewing experience comprises at least one of: user awareness of video quality, user viewing experience between communicating users, user ratings or user feedback.

18. A non-transitory computer-readable medium storing a set of instructions which when executed by a processor of a computer system become operational with the processor for video communications to:

transmit, from a first apparatus using a network, a first video stream of a first user to a second apparatus of a second user, wherein the first user is in video communication with the second user;

receive, from the second apparatus using the network, a second video stream of the second user;

determine a reaction of the second user to an area of interest in the first video stream using the second video stream; and update a parameter for encoding the area of interest in the first video stream at the first apparatus based on the reaction of the second user to the area of interest in the first video stream, wherein one or more tags associated with the reaction of the second user to the area of interest in the first video stream are used to train an adaptive encoder to automatically adjust the parameter for encoding the area of interest in the first video stream to optimize video viewing experiences based on the reaction of the second user.

19. The non-transitory computer-readable medium of claim 18, wherein the video viewing experiences comprise at least one of a subjective user viewing experience or an objective user viewing experience.

20. The non-transitory computer-readable medium of claim 19, wherein the objective user viewing experience comprises at least one of: a delay time, a packet loss ratio, a resolution change, a frame rate change, or a bitrate change, and the subjective user viewing experience comprises at least one of: user awareness of video quality, user viewing experience between communicating users, user ratings or user feedback.

* * * * *